United States Patent
Kneissl

(10) Patent No.: US 10,886,641 B2
(45) Date of Patent: Jan. 5, 2021

(54) COPPER BUSBAR FOR A CONTACT SYSTEM

(71) Applicant: SIEMENS AKTIENGESELLSCHAFT, Munich (DE)

(72) Inventor: Philipp Kneissl, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/330,284

(22) PCT Filed: Jul. 28, 2017

(86) PCT No.: PCT/EP2017/069187
§ 371 (c)(1),
(2) Date: Mar. 4, 2019

(87) PCT Pub. No.: WO2018/050344
PCT Pub. Date: Mar. 22, 2018

(65) Prior Publication Data
US 2019/0207329 A1    Jul. 4, 2019

(30) Foreign Application Priority Data
Sep. 16, 2016 (EP) .................................. 16189125

(51) Int. Cl.
*H01R 4/38* (2006.01)
*F16B 37/04* (2006.01)
(Continued)

(52) U.S. Cl.
CPC .............. *H01R 4/38* (2013.01); *F16B 37/04* (2013.01); *H01R 4/308* (2013.01); *H01R 4/34* (2013.01); *F16B 4/004* (2013.01); *H01R 25/162* (2013.01)

(58) Field of Classification Search
CPC ......... H01R 4/38; H01R 4/308; H01R 25/162
(Continued)

(56) References Cited

U.S. PATENT DOCUMENTS 3,494,399 A * 2/1970 Heighberger ........... F16B 39/28
411/237
5,439,398 A    8/1995 Testa et al.
(Continued)

FOREIGN PATENT DOCUMENTS

CN    201655986 U    11/2010
CN    203951007 U    11/2014
(Continued)

OTHER PUBLICATIONS

PCT International Search Report and Written Opinion of International Searching Authority dated Nov. 29, 2018 corresponding to PCT International Application No. PCT/EP2017/069187 filed Jul. 28, 2017.

*Primary Examiner* — Harshad C Patel
(74) *Attorney, Agent, or Firm* — Henry M. Feiereisen LLC

(57) ABSTRACT

A copper busbar has at least one stepped hole for fastening a cable shoe via a screw connection. The stepped hole extends from a first surface of the copper busbar to a second surface of the copper busbar. The stepped hole has at least a first region, a second region and a third region, wherein the first region of the stepped hole adjoins the first surface, with a radius of the stepped hole being constant over the length of the second region with the second radius value. The third region adjoins the second surface, wherein the third region has at least at the second surface a radius with a third radius value which is less than the second radius value.

6 Claims, 2 Drawing Sheets

(51) Int. Cl.
  *H01R 4/34* (2006.01)
  *H01R 4/30* (2006.01)
  *H01R 25/16* (2006.01)
  *F16B 4/00* (2006.01)

(58) Field of Classification Search
  USPC ........................................................ 439/809
  See application file for complete search history.

(56) References Cited

U.S. PATENT DOCUMENTS

| | | | |
|---|---|---|---|
| 6,318,940 B1 | 11/2001 | Mitts | |
| 7,297,034 B1 * | 11/2007 | Wieland | H01R 4/64 |
| | | | 439/801 |
| 8,926,345 B2 | 1/2015 | Kim | |
| 2010/0319979 A1 * | 12/2010 | Hsu | H05K 1/0251 |
| | | | 174/262 |
| 2012/0094548 A1 * | 4/2012 | Lumpkins | H01M 10/425 |
| | | | 439/801 |
| 2014/0106210 A1 * | 4/2014 | Deng | H01M 2/30 |
| | | | 429/179 |
| 2014/0369788 A1 * | 12/2014 | Chang | F16B 19/008 |
| | | | 411/501 |
| 2015/0064989 A1 | 3/2015 | Hirasawa | |

FOREIGN PATENT DOCUMENTS

| | | |
|---|---|---|
| DE | 202012007242 U1 | 8/2012 |
| GB | 2034536 A | 6/1980 |
| JP | H09161890 A | 6/1997 |
| RU | 126203 U1 | 3/2013 |
| WO | WO 2011126672 A2 | 10/2011 |

\* cited by examiner

COPPER BUSBAR FOR A CONTACT SYSTEM

CROSS-REFERENCES TO RELATED APPLICATIONS

This application is the U.S. National Stage of International Application No. PCT/EP2017/069187, filed Jul. 28, 2017, which designated the United States and has been published as International Publication No. WO 2018/050344 and which claims the priority of European Patent Application, Serial No. 16189125.4, filed Sep. 16, 2016, pursuant to 35 U.S.C. 119(a)-(d).

BACKGROUND OF THE INVENTION

The invention relates to a copper busbar. The invention further relates to a contact system having such a copper busbar, a cable shoe and a screw connection, wherein the screw connection comprises a self-clinching nut and a screw or bolt. The invention also relates to a converter having such a copper busbar or such a contact system. The invention further relates to a method for producing such a copper busbar.

Copper busbars serve to conduct high currents with low losses. The advantage of the copper in such applications lies in its good conductance value. Copper busbars frequently find application in converters because a copper busbar has only a low inductance and as a result fast switching operations can be realized in the converter. Furthermore, it is often necessary in converters having discrete components, such as semiconductor switches, for example, to attach a cable shoe to the copper busbar in order to establish electrical contact in a cable connection.

The use of self-tapping screws is known from the prior art. The action of screwing the self-tapping screw into the copper busbar causes a thread to be produced in the copper busbar by material displacement.

The use of press-in threaded studs is equally possible. These have a not inconsiderable installation height, which is disadvantageous in many application situations. Furthermore, the high manufacturing costs often make the use of press-in threaded studs appear uneconomical. In addition, the use of nut-and-washer assemblies in combination with cable shoes is always subject to limitations since the seating surface of the conical spring washers must be considered separately.

Bolt connections, as a further alternative, are expensive to manufacture and the installation position is not sufficiently accessible during assembly.

Furthermore, the process of threading on washers entails major problems during assembly and in terms of quality, as a result of which interim solutions using the above-listed means that are known from the prior art and additional washers are not possible.

The object underlying the invention is to improve a copper busbar in terms of its contactability with a cable shoe.

SUMMARY OF THE INVENTION

The object is achieved by means of a copper busbar, wherein the copper busbar has at least one stepped hole for fastening a cable shoe by means of a screw connection, wherein the stepped hole extends from a first surface of the copper busbar to a second surface of the copper busbar, wherein the stepped hole has at least a first region, a second region and a third region, wherein the first region of the stepped hole adjoins the first surface, wherein the radius of the stepped hole is constant over the length of the second region having the second radius value, wherein the third region adjoins the second surface, wherein the third region has, at least at the second surface, a radius having a third radius value, wherein the third radius value is less than the second radius value. The object is further achieved by means of a contact system having such a copper busbar, a cable shoe and a screw connection, wherein the screw connection comprises a self-clinching nut and a screw, wherein the cable shoe is fastened to the second surface by means of the screw, which is introduced into the stepped hole from the side of the second surface, and by means of the self-clinching nut, which is inserted into the stepped hole from the side of the first surface, by screwing of the screw connection. The object is further achieved by means of a converter having such a copper busbar or such a contact system, wherein an electrical termination of the converter and a semiconductor switch of the converter are electrically interconnected by means of the copper busbar. The object is further achieved by means of a method for producing such a copper busbar, wherein the stepped hole of the copper busbar is incorporated into the copper busbar by means of a punching machine.

Further advantageous embodiments of the invention are set forth in the dependent claims.

The invention is based on the knowledge that the introduction of a stepped hole into the copper busbar enables an electrical connection between cable shoe and copper busbar to be established in a simple and reliable manner by means of a screwed connection. In such an arrangement, the stepped hole has three regions at which the hole has a different radius at least in sections. The second region has a constant radius: This serves to guide the press-in nut into the copper busbar. The press-in nut is also centered in the copper busbar. Before the self-clinching nut is pressed in, the first region has a radius that is less than or equal to the second radius value. The third region, which ends at the second surface of the copper busbar, to which the cable shoe is also fastened and at which the cable shoe makes electrical contact with the copper busbar, has a smaller radius than the first and the second region. This small radius, in particular at the second surface of the copper busbar, allows an effective and reliable contact to be achieved with a corresponding force without causing the cable shoe to be bent out of shape to an impermissible extent or excessively deformed as a result of too large a hole on the surface of the copper busbar. In order to enable self-clinching nuts to be used, it is particularly advantageous if a smaller diameter is present at the seating surface for the cable shoe than on the press-in side of the self-clinching nut. This is achieved by means of the stepped hole, which can be produced on conventional punching machines, for example.

In contrast to a solution having a thread cut directly into the copper, a minimum grip length and a minimum screw-in depth can be maintained by means of the solution according to the invention. These minimum dimensions can be ensured by way of a corresponding thread length of the press-in nut. Maintaining the minimum grip length and the minimum screw-in depth is not possible in all cases with a cut thread in conjunction with an inserted screw-and-washer assembly, also referred to as a screw with captive washer components, but is dependent on the thickness of the copper bar.

Compared to a passage geometry with stamped countersink, the copper busbar according to the invention is much less complex because it is subject to significantly lower tolerances in production. There is also no need to use different tools due to different material thicknesses. Reliable manufacture can therefore be assured also at different sites or by different suppliers.

The contact system having such a copper busbar with stepped hole, a cable shoe and a screw connection also fulfills typical requirements with respect to such a screw connection. With this solution, a deformation and flows of material in the cable shoes can be reliably ruled out.

The copper busbar with stepped hole has numerous advantages. In the prior art, either it was necessary to place washers under the cable shoe on self-clinching nuts or the use thereof was not permitted at all unless a second component was also screwed together therewith. The copper busbar with stepped hole allows the immediate, cost-effective use of the self-clinching nuts directly with screw-and-washer assemblies. In this case the connection is more beneficial and more reliable than the passage geometry known from the prior art because it comprises fewer manufacturing steps on the punching machine. There is no passage present to impede the alignment process. The alignment is easier because the nut is clinched at a later time. This is simplified further because no masks are required. Furthermore, the failure rate is lower than with self-tapping screws. The geometry is more robust against surrounding features, such as bends in the sheet metal, for example. Variations in material hardness are furthermore tolerated without problem and the holes have significantly wider tolerances. Also, the screws can be tightened using a standard torque for soft materials and, as in the case of self-tapping screws for example, do not have to be handled with individually determined special torques. Screw connections using a higher torque are also possible. This results through use of the press-in nut as opposed to a thread that has been machined into the copper. Moreover, the stepped hole can also be used directly with other soft materials, such as aluminum, for example. There is no need to determine new torques, diameters or minimum screw-in depths in the test department or laboratory. There is also no need for washers to be threaded on individually. This avoids errors during assembly, thus making this operation more efficient. Furthermore, the stepped hole, in contrast to the passages, can be produced from both punching directions using suitable tools. The thread of the self-clinching nuts is also stronger and also withstands more screwing operations in the case of repair than a thread produced in copper.

The use of the copper busbar with a stepped hole affords a particular advantage in converters. As a result of the fast switching operations of the converter in a range of several kilohertz (kHz) or higher, the use of busbars is advantageous because these have low inductance and therefore reduce or avoid disruptive voltages due to switching operations. Due to the constricted space it is often necessary in this case to create a transition from copper busbars to cable. This can easily be realized by means of the copper busbar and the stepped hole as well as a cable shoe.

In an advantageous embodiment of the invention, a self-clinching nut is pressed into the first surface in the vicinity of the stepped hole centrally into the stepped hole in such a way that the radius in the first region assumes a first radius value and a step is formed between the first region and the second region in the stepped hole, in which the radius at a boundary from the first region to the second region changes from a first radius value to a second radius value in such a way that a seating surface is formed parallel to the first surface at the boundary between first region and second region, and the second radius value is less than the first radius value, wherein the cable shoe can be fastened to the second surface by means of a screw which can be inserted into the stepped hole from the side of the second surface by means of the self-clinching nut. As a result of the self-clinching nut being pressed in, the radius is reduced due to material of the copper busbar being displaced, and after the pressing-in operation assumes a first radius value which is greater than the second radius value. At the resulting transition between the first and the second region, there is therefore an abrupt change in the value of the radius, such that a seating surface is thereby formed with which the toothing of the collar of the press-in nut can engage. By pressing in the nut it is possible to achieve a particularly good connection between self-clinching nut and copper busbar, and with the material of the self-clinching nut there is now a connection possibility available which is able to withstand a high force or, as the case may be, a high torque. This enables correspondingly short screw connections to be realized by means of which the busbar can be secured and/or contacted.

In a further advantageous embodiment of the invention, the second region adjoins the third region, wherein the copper busbar has a cone in the third region, wherein the cone has the second radius value at the boundary to the second region. In this case the cone can extend completely across the third region or only over a part of the third region. If the cone extends only over a part of the third region, a cylinder-shaped section with constant radius having a third radius value can advantageously be present in addition at the boundary to the second surface. This is useful in particular in thick copper busbars. With this arrangement, the fabrication forces can be reduced and tool service lives increased.

In a further advantageous embodiment of the invention, the second region adjoins the third region, wherein the radius of the stepped hole is constant in each case within the first, second and third region. With this geometry, said stepped hole can easily be introduced into a copper busbar in a small number of steps using a punching tool. When introducing the hole, it is particularly advantageous if the first and the second region have the same radius value and the third radius value in the third region is smaller. Only when the self-clinching nut is introduced is there formed in the first region a first radius value which is greater than the second radius value in the second region. In particular the constant radius in the third region imparts a particularly high degree of stability to the copper busbar at the second surface in the environment at which the cable shoe is fastened.

In a further advantageous embodiment of the invention, the copper busbar has a thickness in the range of 4 mm to 6 mm, wherein the third region has a length of at least 2 mm, wherein the third radius value has a value in the range between 2.15 mm and 2.4 mm. This embodiment is suitable in particular for use in a converter. An M4 connection is used as the screw connection in this case. In the performance category featuring a stepped hole geometry for M4 connections that can be produced therewith, this connection can in this case be produced significantly more cheaply and reliably compared to already known connection types. Furthermore, other screw sizes can also be used in an analogous manner for establishing the connection.

In a further advantageous embodiment of the invention, the copper busbar has a recess, wherein a thickness of the copper busbar is reduced in the vicinity of the recess to a lesser thickness in such a way that the self-clinching nut is located completely in the stepped hole and the recess. As a result, protruding parts of the self-clinching nut and, where applicable, also protruding parts of the screw can be avoided. This reduces the risk of injury during assembly without giving rise in return to a higher assembly overhead. It has proven particularly advantageous if the screw also disappears in the recess and does not project beyond the latter. This enables injuries to be easily prevented when work is being carried out on the copper busbar.

BRIEF DESCRIPTION OF THE DRAWING

The invention is described and explained in more detail below with reference to the exemplary embodiments illustrated in the figures, in which.

DETAILED DESCRIPTION OF PREFERRED EMBODIMENTS

Figure 1:
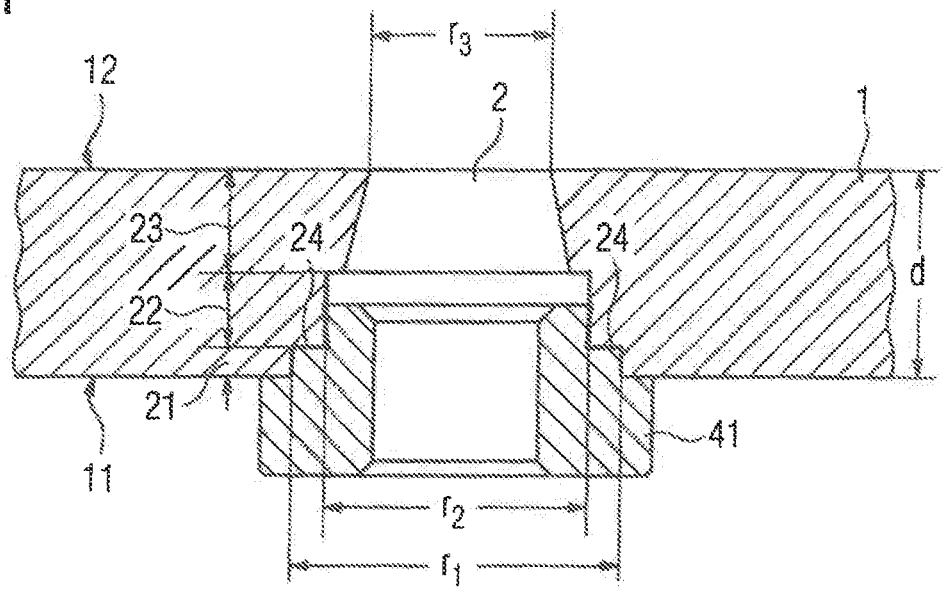
FIG. 1 shows a copper busbar having a stepped hole.

FIG. 1 shows a section of a copper busbar 1 having a stepped hole 2. In this case the copper busbar 1 may have one or more stepped holes 2. The contour of the stepped hole 2 is indicated in the figure by a thicker line weight. The copper busbar 1 comprises a first surface 11 and a second surface 12. Normally, the first surface 11 and the second surface 12 run parallel to one another. The distance between the two surfaces 11,12 is the thickness d of the copper busbar 1. The stepped hole 2 extends through the interior of the copper busbar 1 from the first surface 11 to the second surface 12. In order to produce a connection to a cable shoe 3 (not shown here), a self-clinching nut 41, also known as a press-in nut, is introduced into the stepped hole 2 from the side of the first surface 11. The self-clinching nut 41 bears with its toothing, which is incorporated on its collar, on a seating surface 24. The seating surface 24 is realized in the transition from the first region 21 to the second region 22 by a step change in the value of the radius r from a first radius value $r_1$ to a second radius value $r_2$. In the second region 22, it is advantageous if the radius assumes a constant value over the entire length of the second region 22 in order to guide the self-clinching nut 41 in this second region 22 during its insertion and center the same in the copper busbar 1. The first radius value is formed in the first region 21 with the introduction of the self-clinching nut 41. Before the latter is introduced, the radius value in the first region may have a different value, for example the second radius value $r_2$. An advantageous choice of the third radius value $r_3$ is described in more detail with reference to FIG. 2. In this exemplary embodiment, the radii are constant in each case over the individual regions 21,22,23. This is not absolutely necessary, but permits a particularly favorable fabrication by punching, since in this case only simple standard tools are required on the punching machine. It is particularly advantageous in this process to provide the same radius value in the first and second region 21,22 during the punching of the stepped hole, and to provide a third radius value in the third region 23, which radius is smaller than the second radius value $r_2$. The larger radius in the first region 21 having the first radius value $r_1$ is then produced when the self-clinching nut 41 is introduced.

In order to simplify the introduction of the self-clinching nut 41 during assembly, a greater radius than the second radius value $r_2$ can also be provided already in the first region during the production of the stepped hole.

It is furthermore possible to embody the third region in its entirety, as shown in FIG. 1, or at least in sections, as a cone.

The cone forms a transition from the radius having the second radius value $r_2$ at the boundary between the second region 22 and the third radius value $r_3$. The third radius value is in this case reached at the surface 12, for example, or in the interior of the copper bulbar so that a cylinder-shaped section also follows on between cone and surface 12.

Figure 2:
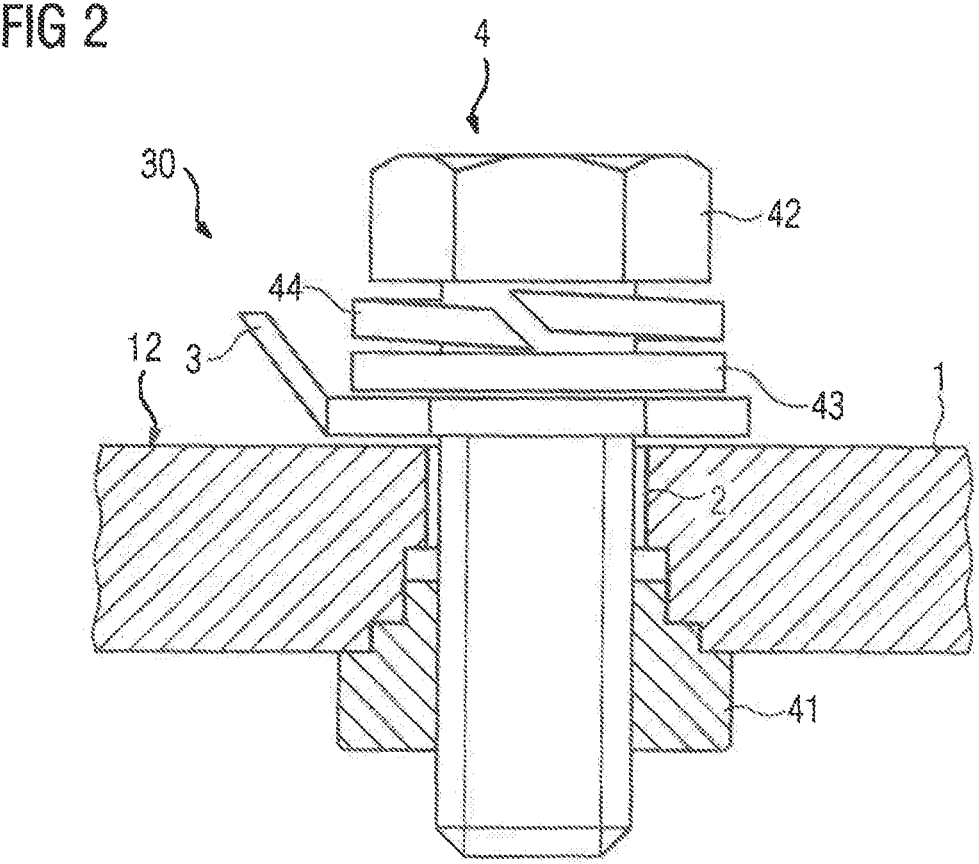
FIG. 2 shows a contact system having a fastened cable shoe.

FIG. 2 shows the copper busbar 1 having a screw connection 4 introduced into the stepped hole 2. Copper busbar 1 and screw connection 4 in combination with the cable shoe 3 constitute a contact system 30. In order to avoid repetitions, reference is made to the description relating to FIG. 1 and the reference signs introduced there. In this exemplary embodiment, the screw connection 4 shown here comprises the self-clinching nut 41, a screw 42, the cable shoe 3, a washer 43 and a spring lock washer 44. The cable shoe is reliably fastened to the second surface 12 of the copper busbar by means of said screw connection 4. However, other systems comprising clamping washer pairs, for example, or having a single washer and mechanical/chemical screw locking device in the self-clinching nut thread are also possible. Even simple screw joints without washer components, or with a single washer without additional locking device, are possible. These are possible in particular when the requirements imposed by the environmental conditions, for example due to vibrations, allow such a connection.

The third radius value $r_3$ is in this case advantageously chosen such that the screw 42 can be introduced into the stepped hole 2 from the second surface 12 without application of force, in particular without touching the copper wall. The smaller the radius value $r_3$, the less likely is the danger that the cable shoe 3 will be bent or deformed due to the clamping pressure of the screw connection 4 when butting against parts of the second surface 12. The radius in the third region is therefore chosen as small as possible, in particular small in relation to the third radius value $r_3$, so that the screw 42 can just about still be inserted through the third region 23. A constant radius over the entire third region 23 has the advantage that the copper busbar 1 then has a high degree of stability and strength in the vicinity of the cable shoe 3. In this way a contact with the cable shoe 3 is established over the entire surface area of the cable shoe, at least over a major part of the surface area of the cable shoe 3, with the result that high current intensities are also possible in addition to the high degree of stability of the connection.

Figure 3:
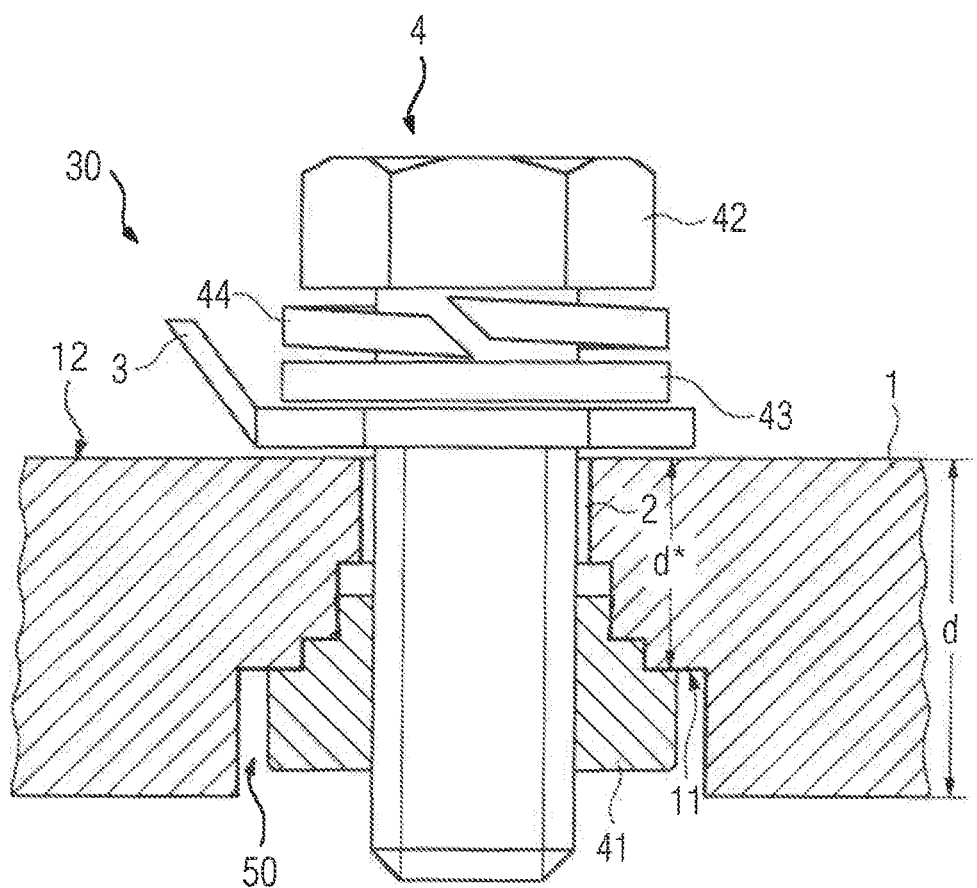
FIG. 3 shows a contact system having a recess.

FIG. 3 shows an exemplary embodiment of a contact system 30, wherein the copper busbar 1 has a recess 50. This recess 50 is embodied in such a way that the self-clinching nut 41 does not project out from the first surface 11 at which the copper busbar 1 has a thickness d. At the recess 50 itself, the first surface is offset inwardly, such that at this point the copper busbar has only a reduced thickness d* and the self-clinching nut 41 is located completely in the recess 50 and the stepped hole 2. It is furthermore particularly advantageous if the screw 42 also does not project out from the recess, since this can help avoid injuries for example when working on/maintaining the copper busbar 1. In order to avoid repetitions, reference is made to the description relating to FIGS. 1 and 2 as well as to the reference signs introduced there.

To sum up, the invention relates to a copper busbar. In order to improve the latter's ability to connect with a cable shoe, it is proposed that the copper busbar has at least one stepped hole for fastening a cable shoe by means of a screw connection, wherein the stepped hole extends from a first surface of the copper busbar to a second surface of the copper busbar, wherein the stepped hole has at least a first region, a second region and a third region, wherein the first region of the stepped hole adjoins the first surface, wherein the radius of the stepped hole is constant over the length of the second region having the second radius value, wherein the third region adjoins the second surface, wherein the third region has, at least at the second surface, a radius having a third radius value, wherein the third radius value is less than the second radius value. The invention also relates to a contact system having such a copper busbar, as well as to a converter having such a copper busbar or such a contact system. The invention further relates to a method for producing such a copper busbar.

What is claimed is:

1. A busbar, comprising:

first and second surfaces; and a stepped hole extending from the first surface to the second surface and configured to include first, second and third regions, with the first region adjoining the first surface and configured for enabling a self-clinching nut to be pressed centrally into the stepped hole in such a way that a radius in the first region assumes a first radius value and a step is formed between the first and second regions, and enabling the self-clinching nut to fasten a cable shoe to the second surface via a screw insertable into the stepped hole from a side of the second surface, said stepped hole defined by a radius which is constant over a length of the second region and defined by a second radius value which is less than the first radius value, said third region ending at the second surface and having at least at the second surface a radius defined by a third radius value which is less than the second radius value, wherein a radius at a boundary from the first region to the second region has a jump from the first radius value to the second radius value to thereby form a seating surface in parallel relation to the first surface at the boundary between the first and second regions for engagement by a toothing of the self-clinching nut, wherein the busbar is made of copper, wherein the second region adjoins the third region, and further comprising in the third region a cone extending completely across the third region and having the second radius value at a boundary to the second region.

2. The copper busbar of claim 1, wherein the copper busbar has a thickness in a range of 4 mm to 6 mm, said third region having a length of at least 2 mm, with the third radius value having a value in a range between 2.15 mm and 2.4 mm.

3. The copper busbar of claim 1, wherein the copper busbar has a recess and a thickness which is reduced in a vicinity of the recess sufficient to enable the self-clinching nut to be located completely in the stepped hole and the recess.

4. A method for producing a copper busbar as set forth in claim 1, said method comprising incorporating the stepped hole of the copper busbar into the copper busbar by a punching machine.

5. A contact system, comprising:

a cable shoe;

a screw connection comprising a self-clinching nut and a screw; and a copper busbar comprising first and second surfaces, and a stepped hole extending from the first surface to the second surface and configured to include first, second and third regions, with the first region adjoining the first surface and configured for enabling the self-clinching nut to be pressed centrally into the stepped hole in such a way that a radius in the first region assumes a first radius value and a step is formed between the first and second regions, and enabling the self-clinching nut to fasten the cable shoe to the second surface via the screw as the screw is inserted into the stepped hole from a side of the second surface, said stepped hole defined by a radius which is constant over a length of the second region and defined by a second radius value which is less than the first radius value, said third region ending at the second surface and having at least at the second surface a radius defined by a third radius value which is less than the second radius value, wherein a radius at a boundary from the first region to the second region has a jump from the first radius value to the second radius value to thereby form a seating surface in parallel relation to the first surface at the boundary between the first and second regions for engagement by a toothing of the self-clinching nut, wherein the second region adjoins the third region, and further comprising in the third region a cone extending completely across the third region and having the second radius value at a boundary to the second region.

6. The contact system of claim 5, wherein the copper bulbar has a recess and a thickness which is reduced in a vicinity of the recess sufficient to enable the self-clinching nut to be located completely in the stepped hole and the recess.

* * * * *